United States Patent
Blankemeier et al.

(10) Patent No.: US 11,286,925 B2
(45) Date of Patent: Mar. 29, 2022

(54) ELECTRONIC APPARATUS AND METHOD FOR OPTIMIZING THE USE OF MOTOR-DRIVEN EQUIPMENT IN A CONTROL LOOP SYSTEM

(71) Applicant: PEOPLEFLO MANUFACTURING, INC., Franklin Park, IL (US)

(72) Inventors: William R. Blankemeier, Oak Park, IL (US); Michael P. Thompson, Chicago, IL (US)

(73) Assignee: PEOPLEFLO MANUFACTURING, INC., Franklin Park, IL (US)

( * ) Notice: Subject to any disclaimer, the term of this patent is extended or adjusted under 35 U.S.C. 154(b) by 228 days.

(21) Appl. No.: 16/392,353

(22) Filed: Apr. 23, 2019

(65) Prior Publication Data

US 2020/0340472 A1    Oct. 29, 2020

(51) Int. Cl.
*F04B 49/08* (2006.01)
*H02P 29/00* (2016.01)
*F04B 49/10* (2006.01)
*F04C 28/28* (2006.01)
*G05B 13/02* (2006.01)

(52) U.S. Cl.
CPC ........... *F04B 49/08* (2013.01); *F04B 49/103* (2013.01); *F04C 28/28* (2013.01); *G05B 13/021* (2013.01); *H02P 29/00* (2013.01); *F04C 2240/81* (2013.01)

(58) Field of Classification Search
None
See application file for complete search history.

(56) References Cited

U.S. PATENT DOCUMENTS

| | | | |
|---|---|---|---|
| 3,797,966 A | 3/1974 | Randell | |
| 4,225,289 A * | 9/1980 | Burkett | F04D 27/0261 417/18 |
| 4,277,832 A | 7/1981 | Wong | |
| 4,468,171 A * | 8/1984 | Katsumata | F04D 27/00 417/17 |
| 4,720,245 A | 1/1988 | Takata et al. | |
| 4,784,580 A * | 11/1988 | Takata | F04D 27/004 417/295 |
| 5,904,292 A | 5/1999 | McIntosh | |
| 6,546,295 B1 | 4/2003 | Pyotsiaet et al. | |
| 6,597,958 B1 | 7/2003 | Starr | |
| 7,007,466 B2 | 3/2006 | Price | |
| 7,142,125 B2 * | 11/2006 | Larson | F04D 27/004 340/635 |
| 7,797,062 B2 | 9/2010 | Discenzo et al. | |
| 7,925,385 B2 | 4/2011 | Stavale et al. | |
| 8,126,575 B2 | 2/2012 | Attarwala | |
| 9,091,259 B2 * | 7/2015 | Tamminen | F04D 15/0066 |

(Continued)

OTHER PUBLICATIONS

International Search Report and Written Opinion for PCT Application No. PCT/US20/27584 dated Aug. 28, 2020.

*Primary Examiner* — Peter J Bertheaud
*Assistant Examiner* — Geoffrey S Lee
(74) *Attorney, Agent, or Firm* — Cook Alex Ltd.

(57) ABSTRACT

An apparatus and method to be implemented with a control loop system that includes machine set, wherein the machine set includes a working machine, an electric motor driving the working machine, and a final control element, and wherein the apparatus and method optimize the state of the machine set to minimize power consumption of the motor and maximize reliability of the machine set.

27 Claims, 10 Drawing Sheets

(56) References Cited

U.S. PATENT DOCUMENTS

| | | | |
|---|---|---|---|
| 9,605,680 B2 | 3/2017 | Stiles et al. | |
| 2004/0193326 A1 | 9/2004 | Phillips et al. | |
| 2005/0280384 A1* | 12/2005 | Sulfstede | F04D 27/004 |
| | | | 318/432 |
| 2005/0283277 A1 | 12/2005 | Schulz | |
| 2006/0099084 A1* | 5/2006 | Otaki | F24F 11/77 |
| | | | 417/42 |
| 2006/0176186 A1* | 8/2006 | Larson | H05K 7/20209 |
| | | | 340/635 |
| 2007/0024229 A1 | 2/2007 | Caro | |
| 2010/0306001 A1 | 12/2010 | Discenzo | |
| 2012/0283950 A1 | 11/2012 | Anderson et al. | |
| 2013/0068313 A1 | 3/2013 | George et al. | |
| 2013/0108473 A1* | 5/2013 | Tamminen | F04B 49/103 |
| | | | 417/3 |
| 2014/0069091 A1 | 3/2014 | Franzoni et al. | |
| 2014/0086759 A1 | 3/2014 | Hovel et al. | |
| 2015/0090342 A1 | 4/2015 | Cartwright et al. | |
| 2015/0377318 A1 | 12/2015 | Byrne | |
| 2018/0247202 A1 | 8/2018 | El Ferik et al. | |
| 2018/0291895 A1* | 10/2018 | Afshari | F04C 14/08 |

\* cited by examiner

ELECTRONIC APPARATUS AND METHOD FOR OPTIMIZING THE USE OF MOTOR-DRIVEN EQUIPMENT IN A CONTROL LOOP SYSTEM

FIELD OF THE INVENTION

The present invention generally relates to industrial process control loop systems, and more particularly to an apparatus and method for optimizing the state of a control loop machine set, including an electric motor, a working machine, and a final control element, which are installed in a control loop system.

BACKGROUND

Control systems for industrial process applications include many control loops which themselves include physical and logical components necessary to perform four functions: 1) provide hydraulic or pneumatic energy to a system in the form of pressure and flow; 2) measure a process variable such as flow, pressure, or temperature; 3) compare the process variable measurement to a process variable set point; and 4) adjust a final control element to force the process variable toward the process variable set point.

A first type of prior art control loop may include an electric motor, a working machine such as a pump or fan driven by the electric motor at a fixed speed, and a final control element such as a modulating control valve or damper in fluid communication with the working machine. Said control loops further include at least one feedback sensor to measure a process variable, such as flow, pressure, or temperature which is in communication with a controller, such as a distributed control system (DCS) or programmable logic controller (PLC), or with a transmitter which receives and conditions a signal from the sensor and subsequently transmits the conditioned signal to controller. The controller receives a process variable measurement, compares the measurement with a specified process variable set point, and outputs a signal to adjust the final control element in an attempt to maintain the process variable at the specified set point. In industrial process applications, the controller may implement well-known control methodologies such as proportional-integral-derivate (PID) control.

Each machine of the control loop machine set may be evaluated in terms of reliability, which is known to be the ability of a machine to sustain performance throughout its useful life. Decreased reliability is therefore associated with unplanned maintenance, unexpected production downtime, and a reduction in useful life. Costs associated with maintenance, downtime, and power consumption are typically the most substantial factors in the lifecycle cost of the control loop machine set. For such reasons, an objective of maximizing reliability and minimizing power consumption while satisfying system demand provides the greatest benefit to the user.

The first type of prior art control loop is most common in industrial process applications, and it is considered to be a reliable and well-understood technology. The final control element is utilized to provide precise process variable control over a wide process variable range with a variety of available valve types and control characteristics. However, there are well-known disadvantages of the first type of prior art control loop. For instance, incorrect sizing, which often is the result of intentional oversizing of the working machine, frequently leads to the working machine operating away from the best efficiency point (BEP), which reduces the working machine efficiency and reliability, while correct sizing reduces system flexibility to accommodate future system or set point changes. Further, incorrect sizing can force the final control element to operate in a position that reduces the final control element reliability and reduces controllability. Also, substantial excess power is consumed because the working machine is driven to provide greater pressure or flow rate than is required to maintain the set point. In addition, the electric motor and working machine must drive a greater load and at a faster speed than is necessary to maintain the set point, thereby reducing the electric motor and working machine reliability.

A second type of prior art control loop similarly may include an electric motor, a working machine, at least one sensor, and a controller, but a separate final control element is not present in the control loop. Instead, the controller output is directed to an adjustable speed drive (ASD), which attempts to maintain the process variable at the specified set point by adjusting the electric motor speed. Indeed, the controller may be integral to the ASD.

The second type of prior art control loop has several advantages over the first type of prior art control loop. It is known that the working machine is typically driven at a lower speed and thus generally consumes less energy than the first type of prior art control loop. Further, operation at lower speeds is known to generally improve the reliability of the electric motor and the working machine. Additionally, lifecycle costs of a separate final control element are not incurred. However, there are well-known disadvantages of the second type of prior art control loop. For example, process variable control by adjusting speed is less precise than the first type of prior art control loop and, importantly, cannot provide positive shut-off. Further, process variable control by adjusting speed may not be sustainable over a wide operating range because motors may not be adequately cooled at low speeds and power consumption may be increased by reduced efficiency at low speeds. Also, systems with high static head may force the working machine to operate away from the BEP, which reduces working machine efficiency and reliability. In addition, converting from a first type of prior art control loop to a second type of prior art control loop introduces new risk and requires costly analysis and engineering of the physical system and the control logic.

U.S. Pat. No. 7,925,385 (Stavale) attempts to address shortcomings in prior art control loops by using an ASD with the first type of prior art control loop, in a particular way. Stavale gains some advantages of the first type and second type prior art control loops, however, Stavale has additional shortcomings.

For instance, in a control loop with a flow rate process variable, Stavale fails to evaluate valve position and working machine proximity to the BEP. Instead, Stavale assumes that optimal valve position and working machine speed will occur at the least possible speed at which the process variable set point may be achieved, which is not necessarily accurate. In addition, if a minimum allowable speed is not reached, Stavale requires that the modulating control valve becomes temporarily fully open or fully closed, thereby losing the ability to control the process variable and disrupting the process. Also, in a control loop with a pressure process variable, Stavale fails to evaluate valve position and working machine speed. Instead, Stavale assumes that optimal valve position and working machine speed will occur between 90% and 110% of the BEP flowrate, which is not necessarily accurate. Further, Stavale does not consider power consumption in the optimization process. It is only used to determine reference data. For certain motor types, such as induction motors, which are most common to industrial process applications, efficiency is known to decrease dramatically as load decreases. Thus, operating at the lowest possible load is not necessarily equivalent to minimizing power consumption. In summary, Stavale is not able to effectively optimize the state of a control loop machine set that includes an electric motor, a working machine, and a final control element, which is installed in a control loop system.

U.S. Pat. No. 7,797,062 (Discenzo) attempts to address shortcomings in prior art control loops by adjusting a process variable within an allowable range around a set point to achieve one or more control system objectives such as efficiency, component life expectancy, or safety. Specifically, Discenzo identifies the act of varying the operating rate of at least one machine to be a means of adjusting performance. However, there are several shortcomings of Discenzo.

Discenzo does not teach optimization within a control loop in which a controller seeks to maintain a discrete process variable set point. Instead, Discenzo requires that the process variable is permitted to be moved within a range around the set point. The extent to which a control loop may be optimized per Discenzo is dependent upon the size of the allowable range. As it pertains to the output of an individual control loop, the range may be narrow. Discenzo is not able to effectively optimize the state of a control loop machine set that includes an electric motor, a working machine, and a final control element, which is installed in a control loop system.

SUMMARY

The present invention addresses shortcomings in prior art control loop systems by providing an apparatus and method to be implemented alongside a first type of prior art control loop system that includes a working machine, an electric motor driving the working machine, and a final control element, herein referred to as a machine set, wherein the apparatus and method optimizes the state of the machine set to minimize power consumption of the motor and maximize reliability of the machine set. It is understood that the state of the machine set includes collective operating conditions of machine set components. The apparatus and method may be said to operate independently of the process controller of the control loop system, in that implementation does not require physical changes to the control loop system, logic changes to the process controller, or communication with the process controller or control loop feedback instrumentation. Instead, the apparatus is installed in the power supply to the motor and has the hardware necessary to alter the power supply so as to control the motor speed. Similarly, the method is to be implemented from a device at this location with the ability to control the motor speed.

In a first aspect, the present disclosure provides an apparatus for optimizing a state of a machine set, wherein the machine set includes a working machine, an electric motor driving the working machine and a final control element, and wherein the machine set is installed in a control loop system for which a process controller utilizes a feedback signal to control a process variable at a set point by adjusting a position of the control element. The apparatus includes at least one sensor that measures at least one physical property of the machine set including acceleration, velocity, temperature, power, torque, voltage, current, frequency, pressure, flow or speed, and at least one computer system including a processor, memory that stores data and computer-executable instructions, hardware that communicates with the at least one sensor, and program instructions that store into the memory at least one input data set acquired from the at least one sensor. The apparatus also includes a characteristic data set stored in the memory of the at least one computer system which describes at least some physical properties, operational behavior and allowable operating ranges of the machine set and the control loop system, and a controller in communication with the at least one computer system that controls a speed of the electric motor. The apparatus utilizes the characteristic data set and the at least one input data set to estimate a state of the machine set and estimate the set point, implement an optimization method which seeks to minimize power consumption of the electric motor and maximize reliability of at least the working machine, determine a target state that can be reached by adjusting the speed of the electric motor to coincide with the set point and which is contained within the allowable operating ranges, and control the speed of the electric motor to reach the target state.

In a second aspect, the present disclosure provides a method for optimizing a state of a machine set, wherein the machine set includes a working machine, an electric motor driving the working machine and a final control element, and wherein the machine set is installed in a control loop system for which a process controller utilizes a feedback signal to control a process variable at a set point by adjusting a position of the final control element. The method includes acquiring an input data set comprising at least one variable measured by at least one sensor measuring at least one physical property of the machine set including acceleration, velocity, temperature, power, torque, voltage, current, frequency, pressure, flow, or speed, and utilizing the input data set and a characteristic data set, which describes at least some physical properties, operational behavior and allowable operating ranges of the machine set and the control loop system, to approximate a state of the machine set. The method further includes estimating a set point of the control loop system from the state of the machine set, utilizing the characteristic data set and the set point to generate at least one correlation function which defines an expected range of the at least one input data set throughout a range of allowable working machine and electric motor speeds, and determining a set of multiple possible states at the set point and contained within allowable operating ranges of the machine set, as defined within the characteristic data set. The method also includes performing an optimization process which seeks to minimize power consumption of the electric motor and maximize reliability of at least the working machine to determine a target state from the set of multiple possible states, changing the electric motor speed toward the target state in at least one speed change increment until the target state is achieved, and acquiring at least one input data set after each of the at least one speed change increments and validating that said at least one input data set is contained within the expected range of the at least one input data set as defined by the at least one correlation function at the changed speed.

It is to be understood that when a motor speed change occurs, as initiated by the apparatus or method to reduce power consumption and improve reliability, the process variable sensor will measure a change in process variable and, subsequently, the process controller of the control loop system will react by adjusting the final control element to move the process variable toward the set point, without involvement of the apparatus or method.

Thus, the apparatus and method of the present disclosure allow the same advantages of the first type of prior art associated with the presence of a final control element, namely, precise process control, positive shutoff, and a wide process variable operating range, while overcoming disadvantages of the first type of prior art by adjusting speed of the motor to reduce power consumption and improve reliability of machine set components, which reduces lifecycle costs. As the apparatus and method of the present disclosure may be implemented alongside an existing control loop system including a final control element, costly analysis and engineering of the physical system and control logic is not required for retrofit applications. Because a set point is maintained by the final control element of the control loop system, the apparatus and method allow optimization over a larger operational range than the second type of prior art associated with the control of the process variable using motor speed. Further, the operational range is substantially larger than in the prior art, which only optimize within a range of acceptable process variable variation around a set point.

The apparatus and method of the present disclosure utilize an input data set including a measurement of at least one physical property of a machine set and a characteristic data set which at least partly describes the properties, operational behavior, and allowable operating range of the machine set. It is to be understood that the input data set must have some relationship to the characteristic data set from which further information about the machine set may be derived. Thus, the apparatus and method of the present disclosure are able to estimate states of the machine set, which enables accurate evaluation of optimization criteria and provides the ability to work effectively with a variety of machine set components having differing characteristics.

The apparatus and method of the present disclosure estimate the set point of the control loop system from the state of the machine set at a given condition, typically when steady state operation is detected. The apparatus and method also are able to determine future states as functions of motor speed because they are coincident with this set point which is maintained independently by the control loop system. A correlation function utilized in the method of the present disclosure describes the relationship between an expected input data set and motor speed to enable validation that a state estimated after a speed change is consistent with expectations. The ability of the apparatus and method to estimate future states and the validation provided by the correlation function of the method allow the present invention to choose an optimal future state while reducing the risk of process disruption upon adjusting motor speed to reach the optimal future state.

BRIEF DESCRIPTION OF THE DRAWINGS

In describing the preferred embodiments, references are made to the accompanying drawing figures wherein like parts have like reference numerals, and wherein.

DETAILED DESCRIPTION

Figure 1:
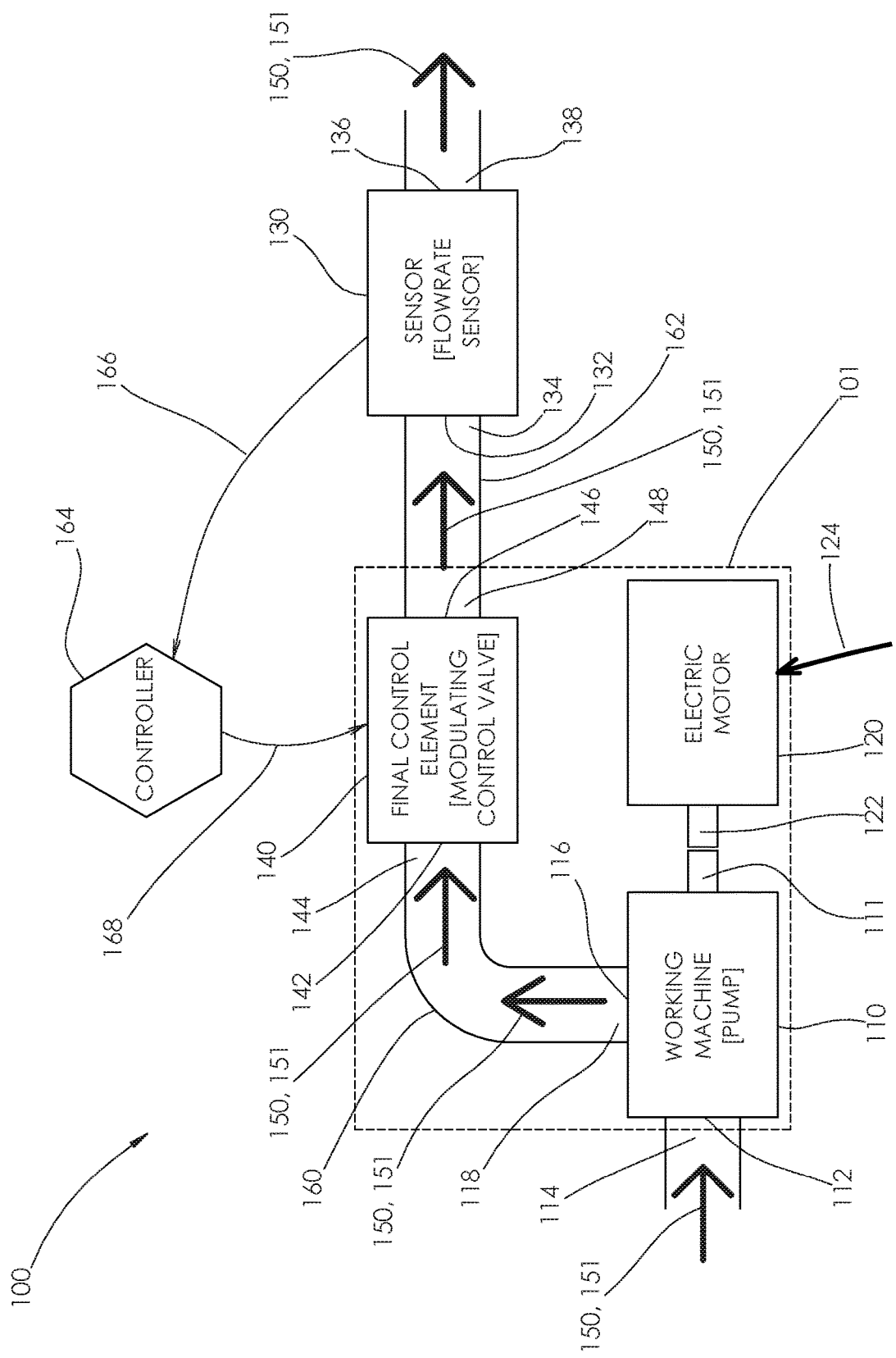
FIG. 1 shows a first embodiment of a prior art control loop system having a throttling control configuration.
Figure 2:
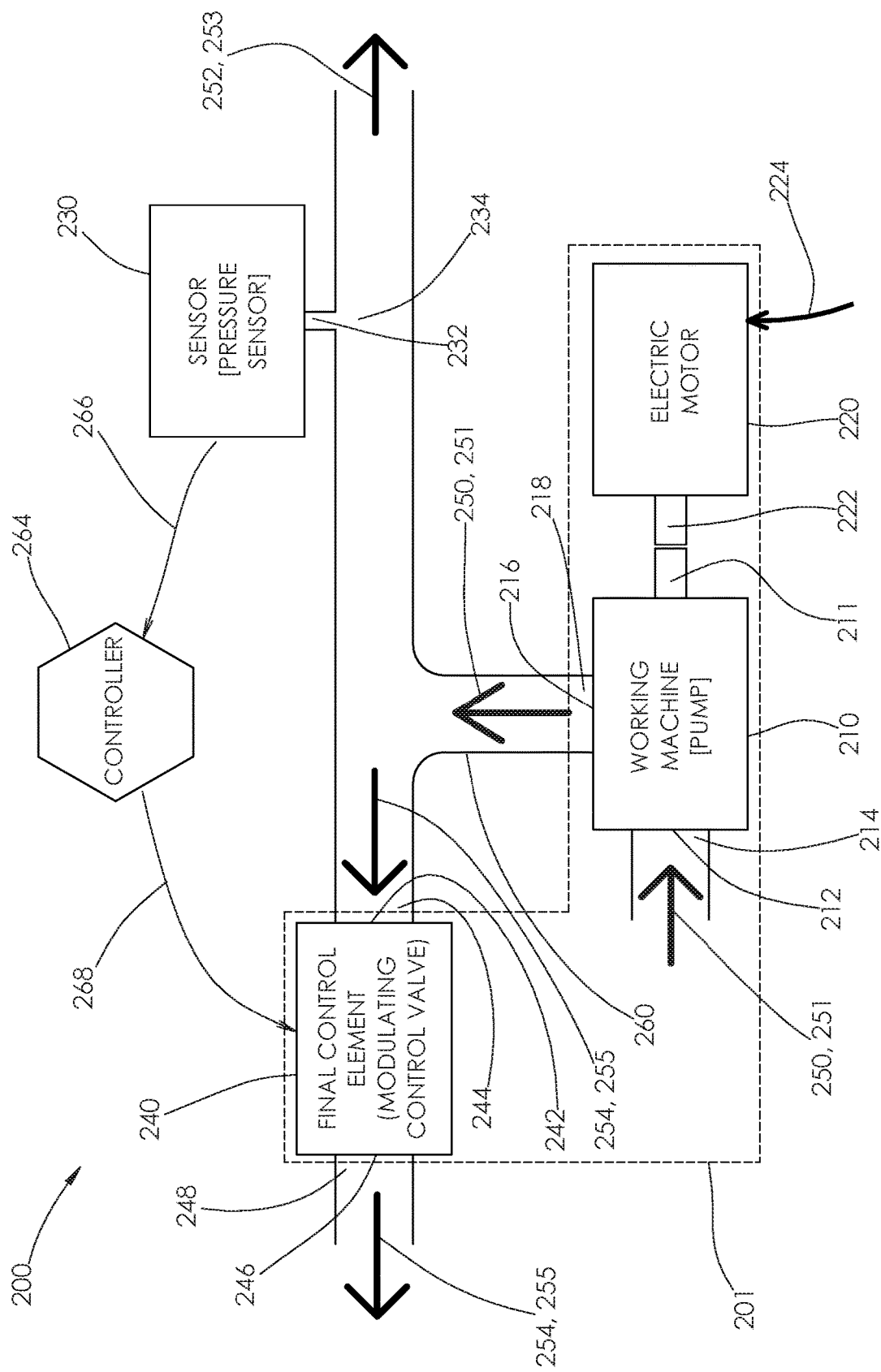
FIG. 2 shows a second embodiment of a prior art control loop system having a bypass control configuration.
Figure 3:
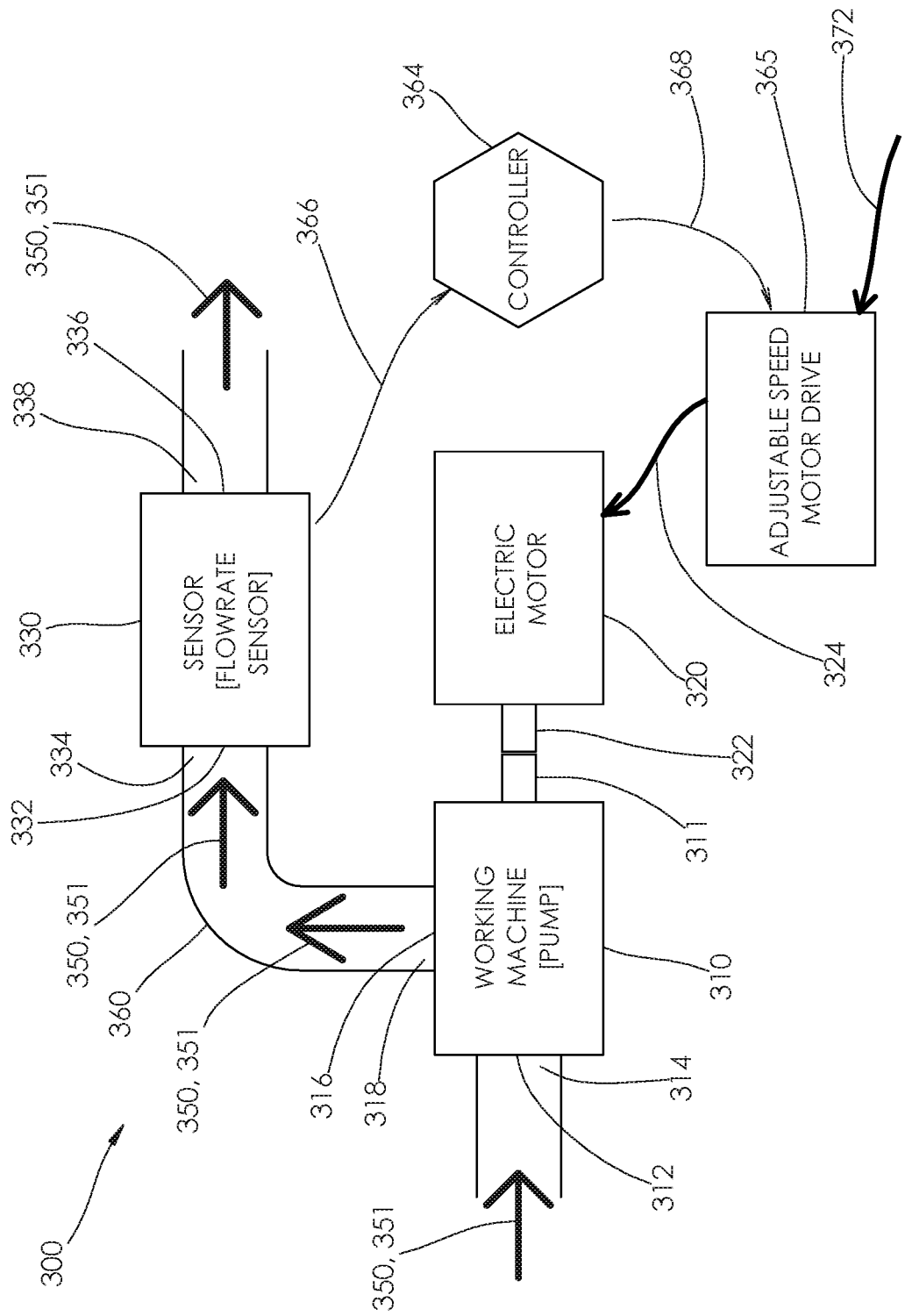
FIG. 3 shows a third embodiment of a prior art control loop system having an adjustable speed control configuration.

FIGS. 1-3 illustrate example embodiments of prior art process control loops and it will be appreciated that an understanding of these prior art process control loops is important to properly understand and appreciate disclosure of the present invention.

FIG. 1 shows a first example embodiment of a prior art control loop system (100), which is shown in a throttling control configuration. Control loop system (100) includes a working machine (110), which in this example includes a pump, such as a rotodynamic pump, an electric motor (120), a final control element (140), such as a modulating control valve, a sensor (130), such as a flowrate sensor, and a process controller (164). A machine set (101) is defined as the three primary machines in control loop system (100), namely, pump (110), motor (120) and modulating control valve (140). Control loop system (100) further includes piping (160) that connects a pump outlet port (116) to a control valve inlet port (142) and piping (162) that connects a control valve outlet port (146) to a flowrate sensor inlet port (132).

Electric motor (120) has a shaft (122) that is rotatably coupled to a shaft (111) of pump (110) to enable the transmission of mechanical power. When motor (120) receives electrical power (124), motor shaft (122) rotates, which causes pump shaft (111) to rotate, which generates pumping action that drives a pumpage stream (150) to flow through control loop system (100) at a flowrate (151). In this embodiment, it is understood that provision of electrical power (124) is configured to rotate motor shaft (122) at a fixed speed.

Pumpage stream (150) enters pump (110) through a pump inlet port (112) at a pump inlet pressure (114) and exits through pump outlet port (116) at a pump outlet pressure (118). Pumpage stream (150) continues through piping (160) into modulating control valve (140) through control valve inlet port (142) at a control valve inlet pressure (144). Normally, pump outlet pressure (118) and control valve inlet pressure (144) are considered to be identical, because there is usually minimal frictional losses and minimal elevation difference between them.

Modulating control valve (140) is the final control element in this example, and it is understood to be equipped with a means of actuating the valve, such as a positioner which uses an input electrical signal to control a pneumatic pressure that is provided to an actuator, which is mechanically linked to a valve stem, wherein the pneumatic pressure is thereby applied to the valve stem to affect the position of the valve stem. It is well-known to one skilled in the art that a range of movement permitted by the valve stem is known as the valve travel, and that the extremes of this range are known as fully open and fully closed positions. The position of the valve stem at a given time may be defined in terms of a percent travel. It is further known that the flowrate through and differential pressure across the modulating control valve are functions of the percent travel. A flow coefficient is commonly used to characterize the relationship between flowrate and differential pressure.

Pumpage stream (150) continues through modulating control valve (140) and exits through control valve outlet port (146) at control valve outlet port pressure (148). Pumpage stream (150) continues through piping (162) into flowrate sensor (130) through flowrate sensor inlet port (132) at flowrate sensor inlet port pressure (134). Normally, control valve outlet pressure (148) and flowrate sensor inlet pressure (134) are considered to be identical, because usually there are minimal frictional losses and minimal elevation differences between them.

Pumpage stream (150) continues through flowrate sensor (130), exits through flowrate sensor outlet port (136) at flowrate sensor outlet port pressure (138) and flows to a final destination.

Flowrate sensor (130) may employ one of many flow measurement technologies known to one skilled in the art for converting volumetric fluid flowrate into an electrical signal, such as those based on differential pressure, variable area, or positive displacement principles. Flowrate sensor (130) may be in direct electrical communication with controller (164), such as is illustrated in FIG. 1, or optionally with a transmitter which receives and conditions a signal from flowrate sensor (130) and transmits the conditioned signal to controller (164).

Controller (164) is configured to utilize a feedback signal (166) from flowrate sensor (130) to control a process variable at a set point by adjusting the percent travel of modulating control valve (140). In this embodiment, the process variable is flowrate, but in other embodiments it may be pressure, tank level or other variable types. Controller (164) receives feedback signal (166) from flowrate sensor (130) and converts it to a process variable representing flowrate (151) measured by flowrate sensor (130). Controller (164) calculates an output signal (168), to affect modulating control valve (140) percent travel, by using one of many control methodologies known to one skilled in the art, such as proportional-integral-derivative (PID) control, wherein controller (164) acts to maintain the process variable at the set point generally by moving the process variable toward the set point. Output signal (168) is received by control valve (140), which adjusts the percent travel and thereby affects flowrate (151) and pressures (114), (118), (144), (148), (134), (138) in control loop system (100).

Turning to FIG. 2, a second embodiment prior art control loop system (200) is shown in a bypass control configuration. Control loop system (200) comprises a working machine, which in this case includes a rotodynamic pump (210), an electric motor (220), a final control element, which in this case is a modulating control valve (240), a pressure sensor (230) and a process controller (264). A machine set (201) is defined as the three primary machines in control loop system (200), namely, pump (210), motor (220) and modulating control valve (240). Control loop system (200) further includes piping (260) that connects a pump outlet port (216) to a control valve inlet port (242) and a pressure sensor inlet port (232).

Electric motor (220) has a shaft (222) that is rotatably coupled to a shaft (211) of pump (210) to enable the transmission of mechanical power. When motor (220) receives electrical power (224), motor shaft (222) rotates, which causes pump shaft (211) to rotate, which generates pumping action that drives a primary pumpage stream (250) to flow through pump (210) and into piping (260) at a primary flowrate (251). In this embodiment, it is understood that provision of electrical power (224) is configured to rotate motor shaft (222) at a fixed speed.

Primary pumpage stream (250) enters pump (210) through a pump inlet port (212) at a pump inlet pressure (214) and exits through a pump outlet port (216) at a pump outlet pressure (218). Primary pumpage stream (250) continues through piping (260) and splits into two streams, forward pumpage stream (252) at forward flowrate (253) and bypass pumpage stream (254) at bypass flowrate (255).

Forward pumpage stream (252) continues through piping (260) and flows to a final destination. Pressure sensor (230) is in fluid communication with forward pumpage stream (252) through pressure sensor inlet port (232) and measures a forward pumpage stream pressure (234).

Bypass pumpage stream (254) continues through piping (260), enters modulating control valve (240) through control valve inlet port (242) at control valve inlet port pressure (244), exits through a control valve outlet port (246) at a control valve outlet pressure (248) and flows back to a supply source.

Normally, pump outlet pressure (218), control valve inlet pressure (244), and forward pumpage stream pressure (234) are considered to be identical, because usually there are minimal frictional losses and minimal elevation differences between each of them.

Modulating control valve (240) is understood to be equipped with a means of actuating the valve, such as a positioner which uses an input electrical signal to control a pneumatic pressure that is provided to an actuator, which is mechanically linked to a valve stem, wherein the pneumatic pressure is thereby applied to the valve stem to affect the position of the valve stem. It is well-known to one skilled in the art that a range of movement permitted by the valve stem is known as the valve travel, and that the extremes of this range are known as fully open and fully closed positions. The position of the valve stem at a given time may be defined in terms of a percent travel. It is further known that the flowrate through and differential pressure across the modulating control valve are functions of the percent travel. A flow coefficient is commonly used to characterize the relationship between flowrate and differential pressure.

Pressure sensor (230) employs one of many pressure measurement technologies known to one skilled in the art for converting static pressure into an electrical signal, such as those based on strain gauges. Pressure sensor (230) may be in direct electrical communication with controller (264), such as is shown in FIG. 2, or a transmitter which receives and conditions a signal from pressure sensor (230) and transmits the conditioned signal to controller (264).

Controller (264) is configured to utilize a feedback signal (266) from flowrate sensor (230) to control a process variable at a set point by adjusting the percent travel of modulating control valve (240). In this embodiment, the process variable is pressure, but in other embodiments it may be flowrate, tank level or other variable types. Controller (264) receives a feedback signal (266) from pressure sensor (230) and converts it to a process variable representing pressure (234) measured by pressure sensor (230). Controller (264) calculates an output signal (268), to affect modulating control valve (240) percent travel, by using one of many control methodologies known to one skilled in the art, such as proportional-integral-derivative (PID) control, wherein controller (264) acts to maintain the process variable at the set point generally by moving the process variable toward the set point. Output signal (268) is received by control valve (240), which adjusts the percent travel and thereby affects flowrates (251), (253), (255) and pressures (214), (218), (234), (244), (248) in control loop system (200).

Turning to FIG. 3, a third example embodiment of a prior art control loop system (300) is shown in an adjustable speed control configuration. Control loop system (300) includes a working machine, which in this case includes a rotodynamic pump (310), an electric motor (320), a flowrate sensor (330), an adjustable speed motor drive (365) and a process controller (364). Control loop system (300) further comprises piping (360) that connects a pump outlet port (316) to a flowrate sensor inlet port (332).

Electric motor (320) has a shaft (322) that is rotatably coupled to a shaft (311) of pump (310) to enable the transmission of mechanical power. When motor (320) receives electrical power (324), motor shaft (322) rotates, which causes pump shaft (311) to rotate, which generates pumping action that drives a pumpage stream (350) to flow through pump (310) and into piping (360) at a flowrate (351).

Pumpage stream (350) enters pump (310) through a pump inlet port (312) at a pump inlet pressure (314) and exits through pump outlet port (316) at a pump outlet pressure (318). Pumpage stream (350) continues through piping (360), enters flowrate sensor (330) through flowrate sensor inlet port (332) at flowrate sensor inlet port pressure (334), exits through a flowrate sensor outlet port (336) at a flowrate sensor outlet pressure (338) and flows to a final destination.

Normally, pump outlet pressure (318) and flowrate sensor inlet port pressure (334) are considered to be identical, because usually there are minimal frictional losses and minimal elevation differences between them. Flowrate sensor (330) employs one of many flow measurement technologies known to one skilled in the art for converting volumetric fluid flowrate into an electrical signal, such as those based on differential pressure, variable area, or positive displacement principles.

Flowrate sensor (330) may be in direct electrical communication with controller (364), such as is shown in FIG. 3, or a transmitter which receives and conditions a signal from flowrate sensor (330) and transmits the conditioned signal to controller (364).

Adjustable speed motor drive (365) employs one of many motor drive technologies known to one skilled in the art for driving an electric motor at a range of speeds by adjusting electrical power (324), such as a voltage source inverter, which is commonly used to control the speed of AC induction motors by controlling effective frequency and voltage of electrical power (324) given an input electrical power (372) to the adjustable speed motor drive (365).

Controller (364) is configured to utilize a feedback signal (366) from flowrate sensor (330) to control a process variable at a set point by adjusting the speed of motor (320). In this embodiment, the process variable is flowrate, but in other embodiments it may be pressure, tank level or other variable types. Controller (364) receives feedback signal (366) from flowrate sensor (330) and converts it to a process variable representing flowrate (351) measured by flowrate sensor (330). Controller (364) calculates an output signal (368) for controlling adjustable speed motor drive (365), by using one of many control methodologies known to one skilled in the art, such as proportional-integral-derivative (PID) control, wherein controller (364) acts to maintain the process variable at the set point generally by moving the process variable toward set point. Output signal (368) is received by adjustable speed motor drive (365), which modifies electrical power (324) being supplied to motor (320) to adjust the speed of motor (320) and pump (310), and thereby affecting flowrate (351) and pressures (314), (318), (334), (338) in control loop system (300). It will be appreciated that controller (364) may be integrated into adjustable speed motor drive (365).

Referring now to FIGS. 4-11, it will be appreciated that the electronic apparatus and method of the present disclosure generally may be embodied within numerous configurations. FIGS. 4-11 illustrate a first preferred embodiment of the electronic apparatus and method of the present invention, configured for use with a control loop system that contains a working machine that is a pump, such as a rotodynamic pump, a final control element, such as a modulating control valve, and an electric motor that runs on AC power.

Figure 4:
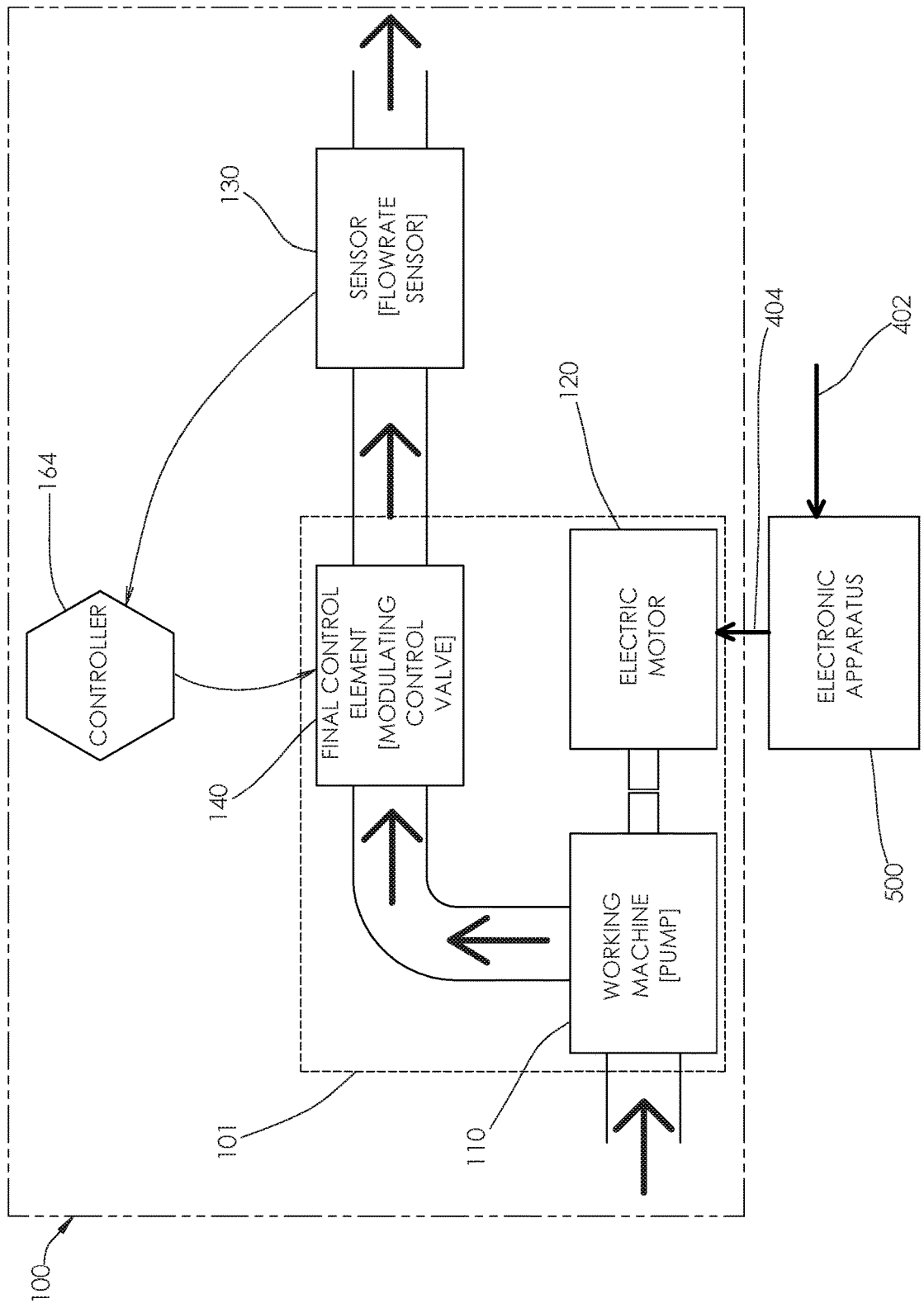
FIG. 4 shows a first embodiment of an electronic apparatus used in a control loop system in a throttling control configuration in accordance with the invention.

In this embodiment, the control loop system is in a throttling control configuration, such as was shown in the first art control loop system (100). FIG. 4 shows a first embodiment electronic apparatus (500) used with control loop system (100), which has been previously described in greater detail in FIG. 1. Apparatus (500) receives an input power supply (402) and transforms it into an output power supply (404) at a voltage and a frequency suitable for rotating motor (120) at a target speed.

Figure 5:
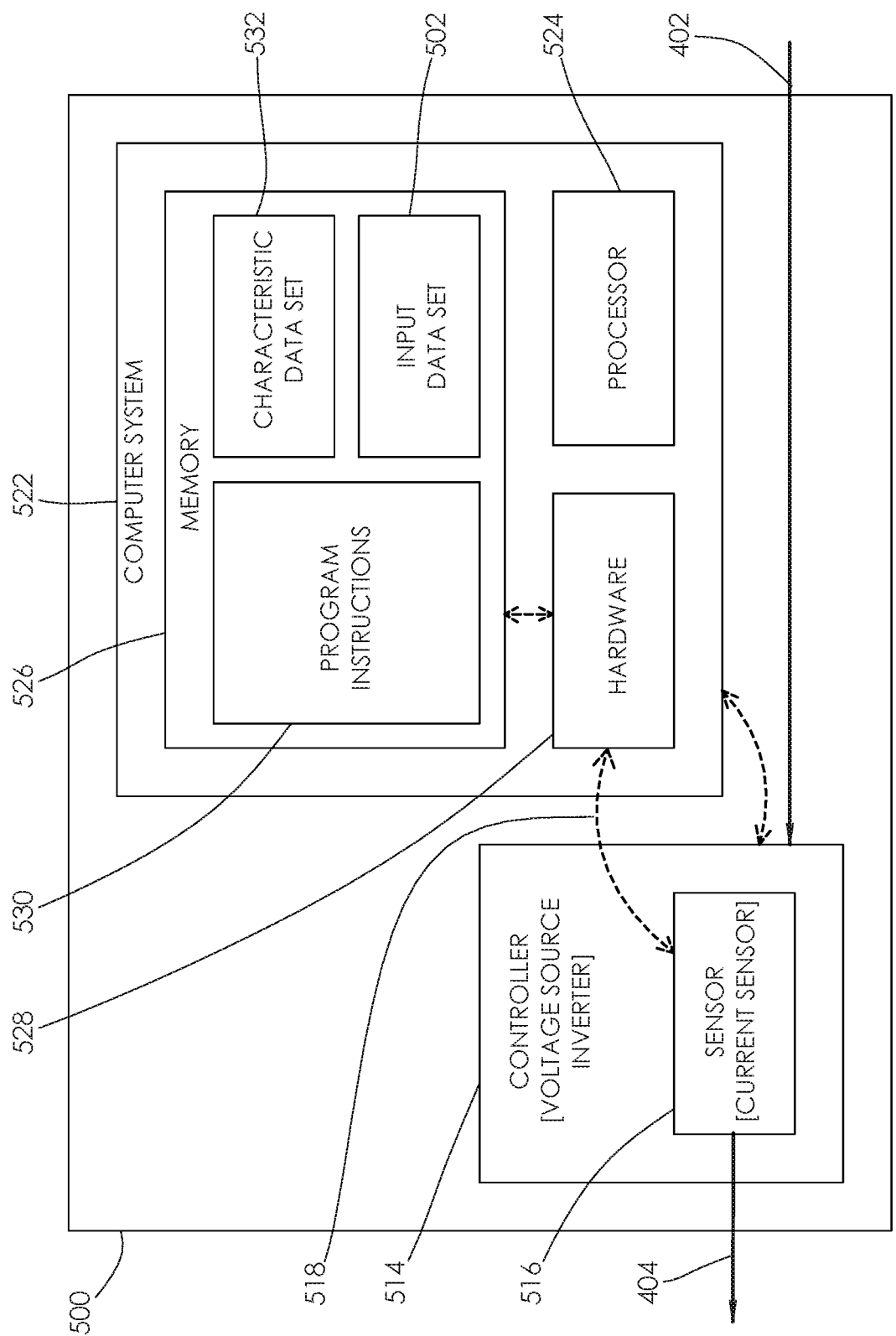
FIG. 5 shows additional details of the apparatus of FIG. 4.

FIG. 5 shows apparatus (500) of FIG. 4. Apparatus (500) includes a controller, in this case a voltage source inverter (514), for controlling the speed of motor (120) by transforming input power supply (402) to output power supply (404) at a voltage and a frequency suitable for rotating motor (120) at a target speed. It will be appreciated that there are many other technologies known to one skilled in the art to control the speed of motor (120) instead of voltage source inverter (514).

Apparatus (500) also includes at least one sensor used to measure at least one physical property of machine set (101), such as acceleration, velocity, displacement, temperature, power, torque, voltage, current, frequency, pressure, flow or speed. In this embodiment, the at least one sensor is a current sensor (516), shown in this embodiment as a component of inverter (514), that provides a signal (518) corresponding to an input variable representing a current of output power supply (404), which flows between apparatus (500) and motor (120). It is to be understood that in place of, or in addition to current sensor (516), apparatus (500) may include any number of sensors measuring any number of physical properties of machine set (101). An input data set (502) includes one or more input variables measured by the one or more sensors. Input data set (502) may also include one or more calculated variables that are dependent upon the one or more input variables. One of the input data set variables is designated as a primary input variable and in this embodiment the primary input variable is a calculated variable for an output power (550) to the motor (120) that is dependent upon the current.

Apparatus (500) further includes a computer system (522), which includes a processor (524), memory (526), program instructions (530) stored in memory (526) and hardware (528). It will be appreciated that hardware (528) may include an analog-to-digital converter integrated circuit, input/output pins on a system on a chip (SoC) or microcontroller, a modular data acquisition module for use with a specific computer system, or a variety of other devices and supporting components suitable for digital or analog communication with the at least one sensor (516).

Computer system (522) is in communication with a controller, in this embodiment a voltage source inverter (514), to control the speed of motor (120). Hardware (528) is configured to communicate with current sensor (516) and utilizes program instructions (530) to store input data set (502) into memory (526). Computer system (522) also includes characteristic data set (532) stored in memory (526), which contains characteristic data that at least partly describes the properties, operational behavior and allowable operating ranges of machine set (101) and control loop system (100). Characteristic data set (532) may be preprogrammed into memory (526), configured during setup, learned during operation, or some combination thereof.

With respect to the characteristic data set (532) for the preferred embodiment shown in FIGS. 4-11, it includes a pump characteristic data set described in connection with FIG. 6, an electric motor characteristic data set described in connection with FIG. 7, a modulating control valve characteristic data set described in connection with FIG. 8 and a control loop characteristic data set described in connection with FIG. 9. It will be appreciated that characteristic data set (532) may contain different or additional data for many different properties and parameters of machine set (101) and control loop system (100), depending on how apparatus (500) is configured to optimize the state of machine set (101). It will be further appreciated that the data in characteristic data set (532) may be stored in multiple forms, such as data tables, formulas or combinations of data tables and formulas.

Figure 6:
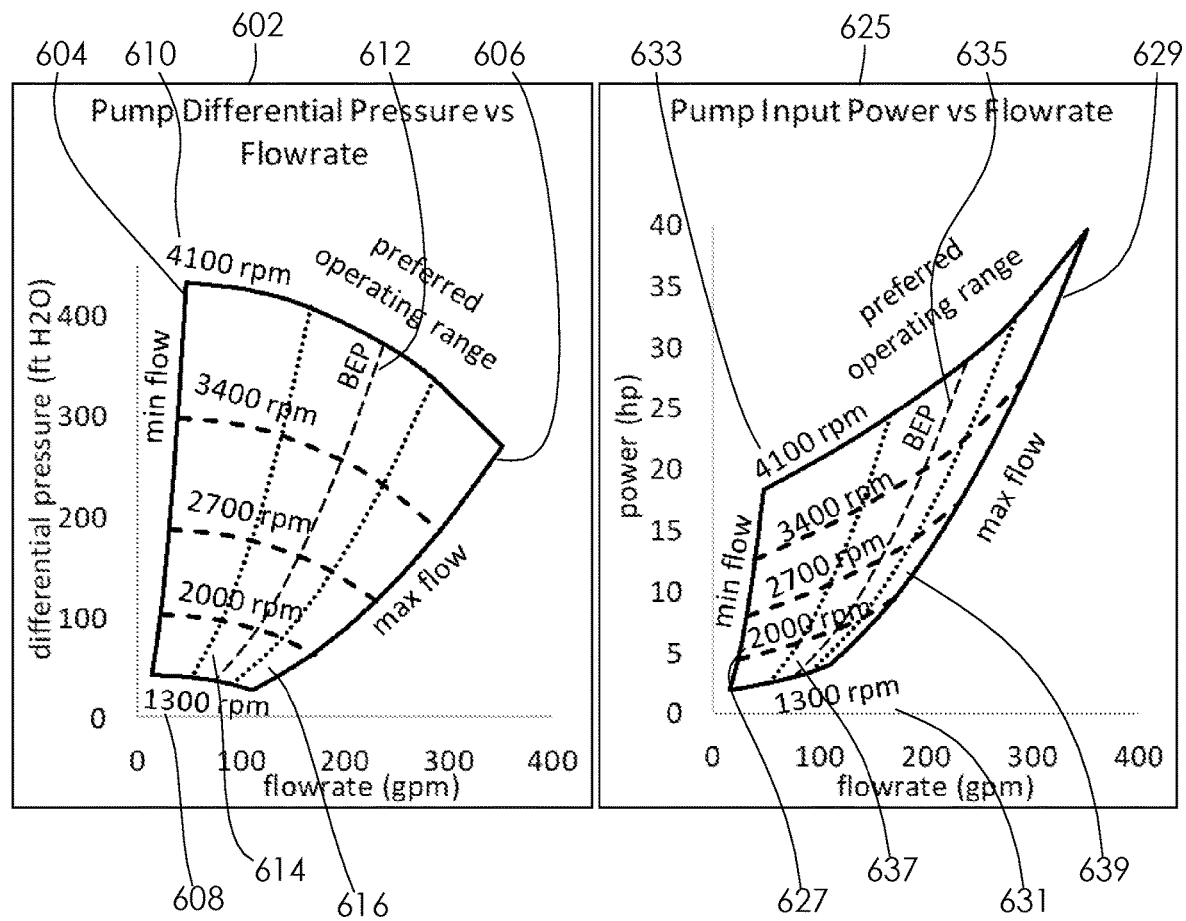
FIG. 6 shows characteristic data of an example pump.
Figure 6:
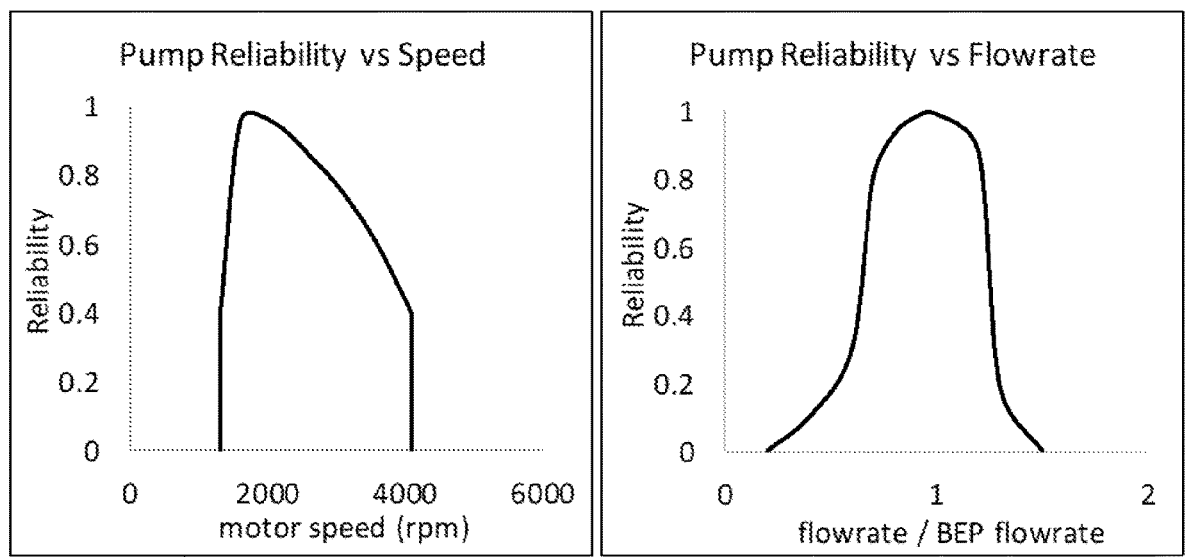

FIG. 6 shows a graphical representation of some of the data that may be included in the pump characteristic data set, which in this example pertain to pump performance and reliability characteristics. Graph (602) shows pump differential pressure as a function of pump flowrate and motor speed. Graph (602) also shows a minimum allowable flowrate as a function of motor speed, represented by a curve (604), and a maximum allowable flowrate as a function of motor speed, represented by a curve (606). Additionally, graph (602) shows a minimum allowable motor speed (608) and a maximum allowable motor speed (610). Graph (602) further includes a curve (612) showing where the pump achieves the best efficiency point, or BEP. Lastly, two curves (614, 616) show the bounds of a preferred operating range for the pump.

FIG. 6 also includes graph (625), which shows pump input power as a function of pump flowrate and motor speed. Graph (625) also shows a minimum allowable flowrate as a function of motor speed, represented by a curve (627), and a maximum allowable flowrate as a function of motor speed, represented by a curve (629). Additionally, graph (625) shows a minimum allowable motor speed (631) and a maximum allowable motor speed (633). Graph (625) further includes a curve (635) showing where the pump achieves the BEP. Lastly, two curves (637, 639) show the bounds of a preferred operating range for the pump.

FIG. 6 also includes graph (650), which shows pump reliability as a function of motor speed, and graph (675), which shows pump reliability as a function of the ratio of pump flowrate to BEP flowrate. In this embodiment, reliability is expressed as unit-less values between 0 and 1, where a greater value represents or equates to greater reliability. It should be understood that there are many other possible numerical methods or representations that may be used interchangeably to quantify reliability.

Figure 7:
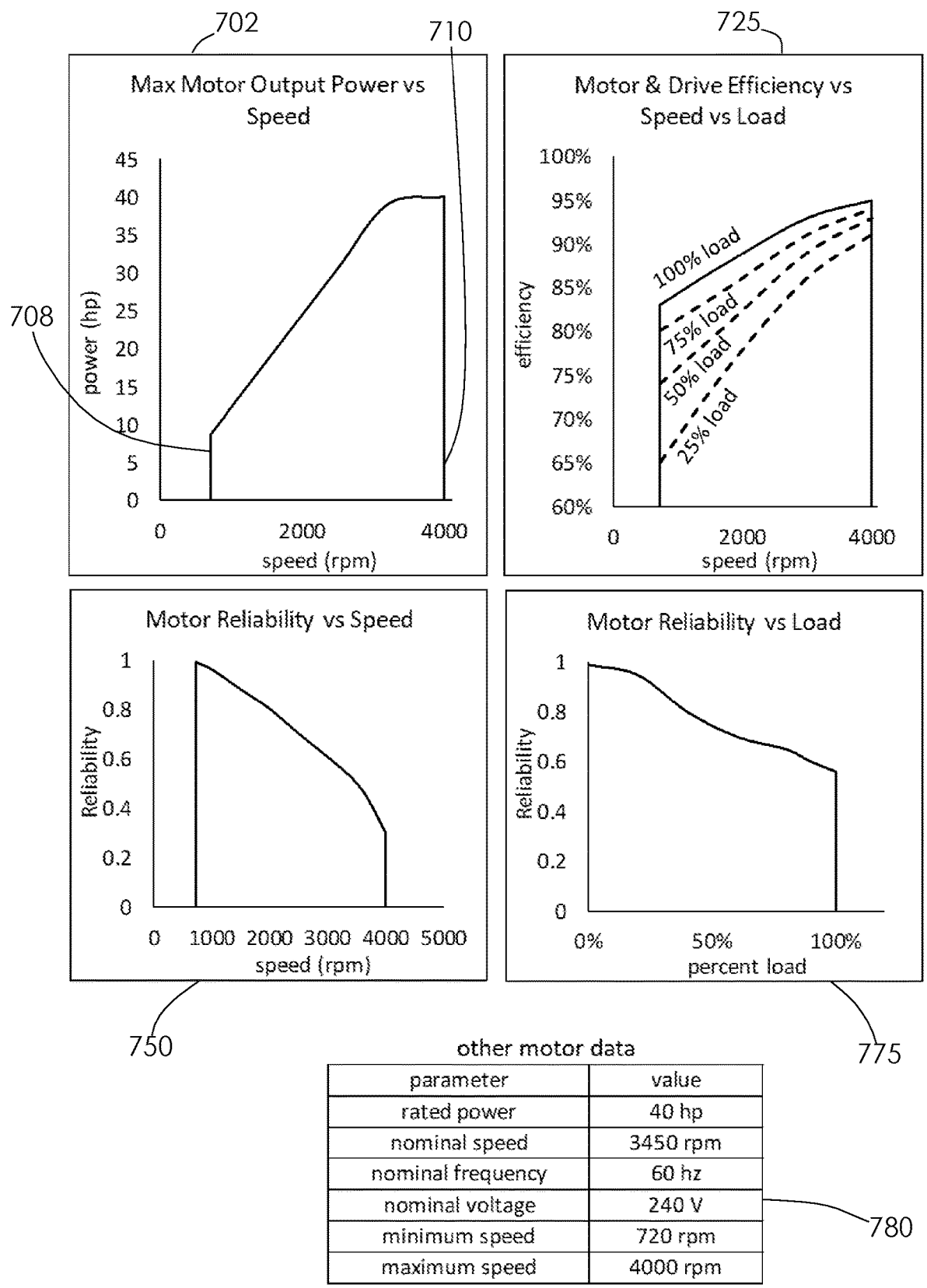
FIG. 7 shows characteristic data of an example electric motor.

FIG. 7 shows a graphical representation of some of the data in the electric motor characteristic data set, which in this example pertain to motor performance and reliability characteristics. Graph (702) shows maximum output power of a motor as a function of motor speed. Graph (702) also shows a minimum allowable motor speed (708) and a maximum allowable motor speed (710). FIG. 7 additionally includes graph (725), which shows motor efficiency as a function of motor speed and motor load. Motor load is expressed as a percent load, which is defined as the ratio of a motor's actual output power to its rated output power.

FIG. 7 further includes graph (750), which shows motor reliability as a function of motor speed, and graph (775), which shows motor reliability as a function of motor load. In this embodiment, reliability is expressed as unit-less values between 0 and 1, where a greater value equates to greater reliability. It should be understood that there are many other possible numerical methods or representations that may be used interchangeably to quantify reliability.

FIG. 7 also includes table (780), which shows some additional motor data in tabular form.

Figure 8:
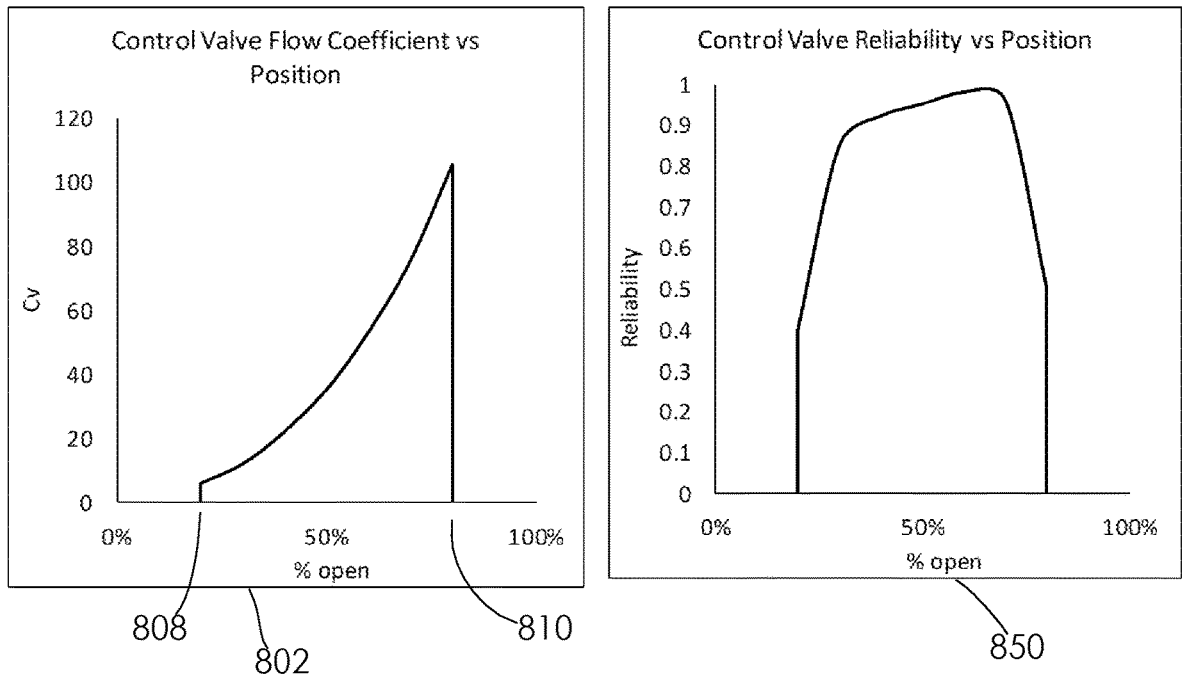
FIG. 8 shows characteristic data of an example modulating control valve.

FIG. 8 shows a graphical representation of some of the data in the modulating control valve characteristic data set, which in this example pertain to modulating control valve performance and reliability characteristics. Graph (802) shows a modulating control valve flow coefficient as a function of modulating control valve position. The modulating control valve flow coefficient is a value well known to those skilled in the art as a relationship between flowrate and differential pressure for the modulating control valve. Graph (802) also shows a minimum allowable valve position (808) and a maximum allowable valve position (810).

FIG. 8 also includes graph (850), which shows modulating control valve reliability as a function of valve position. In this embodiment, reliability is expressed as unit-less values between 0 and 1, where a greater value equates to greater reliability. It should be understood that there are many other possible numerical methods or representations that may be used interchangeably to quantify reliability.

Figure 9:
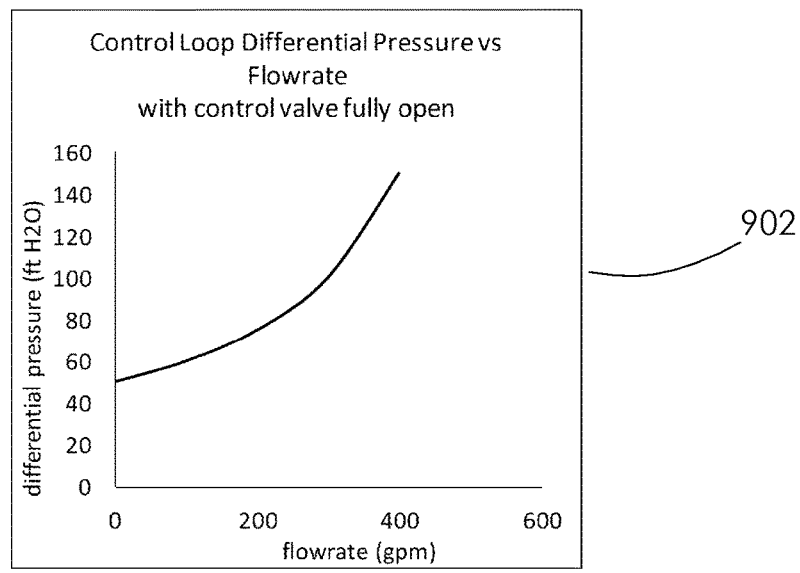
FIG. 9 shows characteristic data of an example control loop system.

FIG. 9 shows a graphical representation of some of the data in the control loop characteristic data set, which in this example pertain to control loop performance characteristics. Graph (902) shows control loop differential pressure, when the control valve is fully open, as a function of flowrate.

Figure 10:
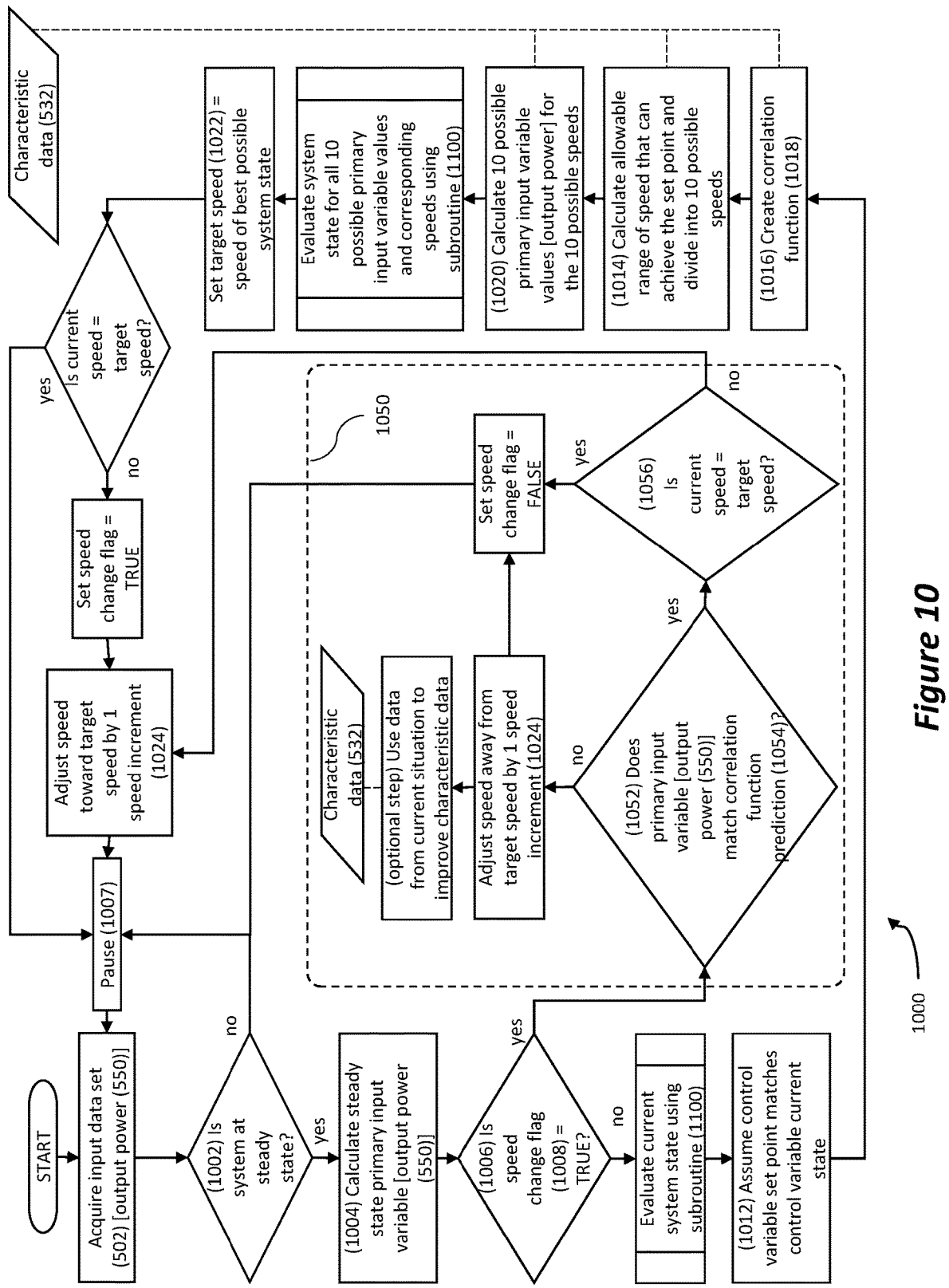
FIG. 10 shows a flowchart illustrating an embodiment of a method of optimizing the state of a machine set in accordance with the invention.

Returning to FIG. 5 and the description of the apparatus 500, it will be appreciated that the apparatus (500) utilizes characteristic data set (532) and input data set (502) to estimate the current state of machine set (101) and the set point of control loop system (100). Then, as illustrated in FIG. 10, apparatus (500) implements a method (1000) to optimize the state of machine set (101) in control loop system (100) which seeks to determine a target state of machine set (101) that minimizes power consumption of motor (120) and maximizes reliability of machine set (101). The target state is one that can be reached by adjusting the speed of motor (120) to a preferred speed, coincides with the set point, and is contained within the allowable operating ranges of the components of machine set (101). Apparatus (500) then controls the speed of motor (120) by adjusting the voltage and frequency of output power supply (404) via voltage source inverter (514) to drive motor (120) at the preferred motor speed to reach the target state.

It will be appreciated that alternative embodiments can easily be envisioned wherein any of the components in apparatus (500) may be divided into multiple components and the tasks may be divided among the multiple components. For example, computer system (522) may be divided into a first computer system that is in communication with inverter (514) and a second computer system that performs the remaining tasks.

Turning to the method, a preferred method (1000) is shown in FIG. 10, which in this example is utilizing output power as the primary input variable within data set (502), a pump as the working machine (110), a flowrate sensor as the sensor (130), and a modulating control valve as the final control element (140). The method (1000) is used by apparatus (500) to optimize the state of machine set (101) of the control loop system (100) shown in FIG. 4. Method (1000) is in the form of a continuous primary loop, with some alternate branches for addressing certain situations, illustrated as a flow chart in FIG. 10. For clarity, a subroutine (1100) that is used multiple times is shown as a single flowchart element in FIG. 10, and is shown in more detail in FIG. 11.

It has been explained that the set point is maintained by controller (164) by using feedback from the flowrate sensor (130) to adjust the modulating control valve (140) percent travel. The present invention cannot directly affect set point or the modulating control valve (140) percent travel. It is further understood that the first embodiment of the present invention is not electrically in communication with controller (164) so as to ascertain the set point directly or with flowrate sensor (130) so as to ascertain the measured flowrate at steady state, which may be assumed to be the set point.

Method (1000) begins when apparatus (500) acquires input data set (502). In this embodiment, input data set (502) contains a calculated variable representing output power (550), although in other embodiments input data set (502) may contain any number of measured or calculated variables related to machine set (100), such as current, acceleration, velocity, displacement, temperature, power, torque, voltage, frequency, pressure, flow, speed or efficiency.

Next, method (1000) performs a steady state check (1002) to determine if control loop system (100) is at steady state, which may be done by evaluating the primary input variable, which in this example is the output power (550), at constant motor speed. If the output power (550) values from the last several cycles are all within a predetermined steady state tolerance, then control loop system (100) is determined to be at steady state, a steady state output power (1004) is calculated as the average of the output power (550) values used to determine steady state, and method (1000) proceeds to a speed change check (1006). But if control loop system (100) is determined to be not at steady state, then method (1000) pauses for a predefined wait time (1007), proceeds to acquire input data set (502) and then returns to steady state check (1002).

Speed change check (1006) determines the status of a speed change flag (1008), which is set to TRUE when a speed change is initiated, and set to FALSE when a speed change is completed. If the speed change flag (1008) =TRUE, then method (1000) moves to an alternate branch (1050), described later. If the speed change flag (1008) =FALSE, then method (1000) proceeds to a state evaluation subroutine (1100), which evaluates and returns the state of machine set (101) given a motor speed (1102) and an input data set (502), which in this embodiment includes output power (550).

Figure 11:
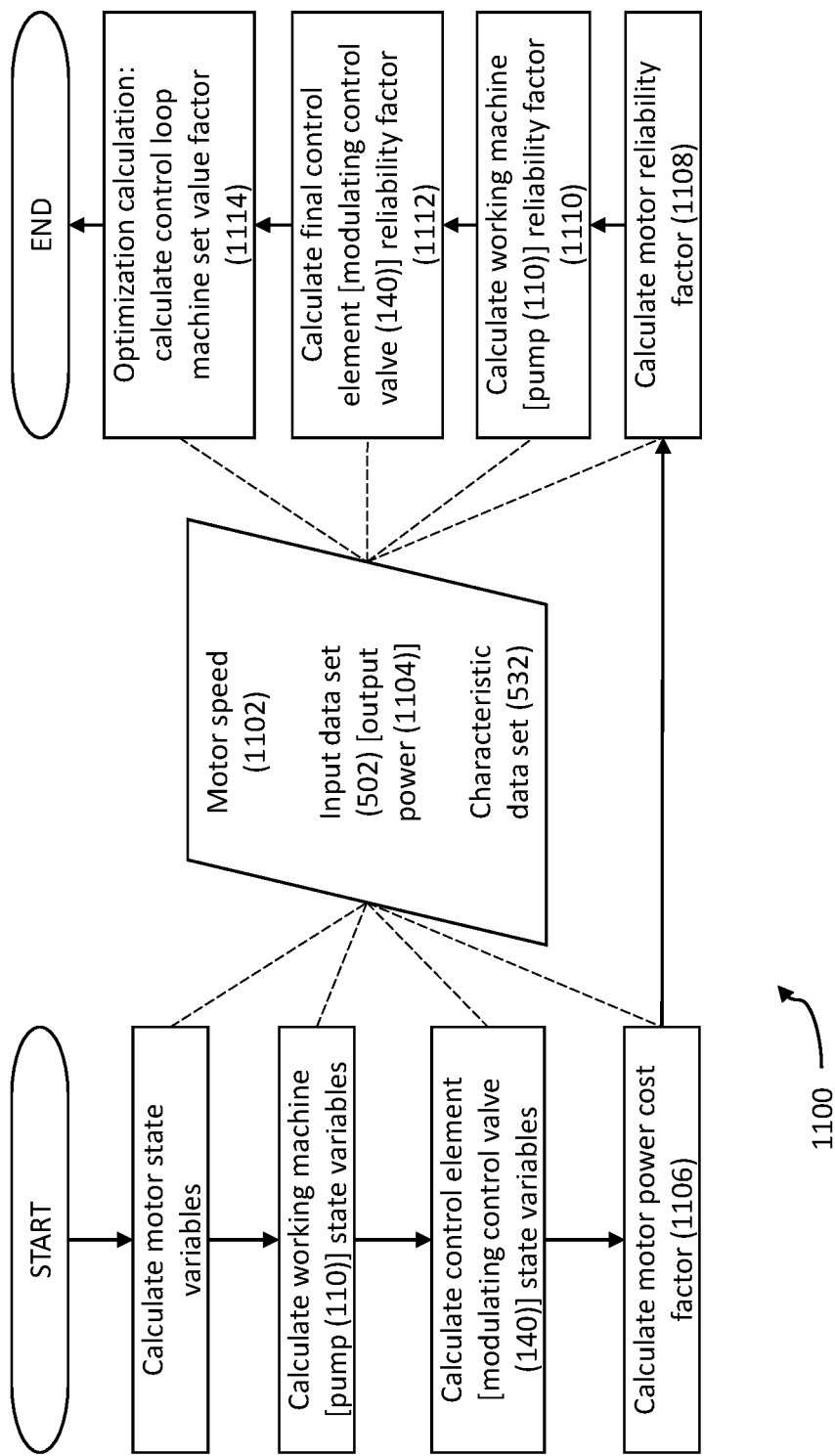
FIG. 11 shows a flowchart illustrating a subroutine of the method of FIG. 10, wherein the subroutine evaluates a state of the machine set.

The subroutine (1100) is illustrated in FIG. 11 as a flow chart. Subroutine (1100) receives a motor speed (1102) and an input data set (502), in this embodiment a corresponding output power (1104), which at this point in the method for this example is equal to output power (550), and uses data from characteristic data set (532) to evaluate and return a state of machine set (101). It will be appreciated that motor speed (1102) and output power (1104) may be actual measured values, such as output power (550), or theoretically predicted valves, depending on usage in method (1000).

First, subroutine (1100) uses motor speed (1102), corresponding output power (1104) and characteristic data set (532) to calculate relevant motor state variables, which may include variables such as input power, output power, efficiency, current, percent load, or any other variable related to the evaluated state of motor (110).

Next, subroutine (1100) uses the calculated state variables and characteristic data set (532) to calculate relevant working machine variables, which in this example are pump state variables, and which may include variables such as input power, input torque, output power, output torque, efficiency, flowrate, inlet pressure, outlet pressure, differential pressure or any other variable related to the evaluated state of pump (110).

Next, subroutine (1100) uses the calculated state variables and characteristic data set (532) to calculate relevant final control element variables, which in this example are control valve state variables, and which may include variables such as valve position, inlet pressure, outlet pressure, differential pressure or any other variable related to the evaluated state of modulating control valve (140).

Next, subroutine (1100) uses the calculated state variables and characteristic data set (532) to calculate a motor power cost factor (1106), which is a unit-less number between 0 and 1, where a greater value equates to lower motor power. The specific calculation is not described here, but it should be understood that there are many numerical methods known in the art that can be used to calculate motor power cost factor (1106).

Next, subroutine (1100) uses the calculated state variables and characteristic data set (532) to calculate a motor reliability factor (1108), which is a unit-less number between 0 and 1, where a greater number equates to greater motor reliability. The specific calculation is not described here, but it should be understood that there are many numerical methods known in the art that can be used to calculate motor reliability factor (1108).

Next, subroutine (1100) uses the calculated state variables and characteristic data set (532) to calculate a working machine reliability factor (1110), which in this example is a pump reliability factor and is a unit-less number between 0 and 1, where a greater number equates to greater pump reliability. The specific calculation is not described here, but it should be understood that there are many numerical methods known in the art that can be used to calculate pump reliability factor (1110).

Next, subroutine (1100) uses the calculated state variables and characteristic data set (532) to calculate a final control element reliability factor (1112), which in this example is a control valve reliability factor and is a unit-less number between 0 and 1, where a greater number equates to greater control valve reliability. The specific calculation is not described here, but it should be understood that there are many numerical methods known in the art that can be used to calculate control valve reliability factor (1112).

Finally, subroutine (1100) performs an optimization calculation that uses motor power cost factor (1106), motor reliability factor (1108), pump reliability factor (1110) and control valve reliability factor (1112) to calculate a machine set value factor (1114), which is a unit-less number between 0 and 1. The greatest machine set value factor (1114) equates to the most optimized state, because it has the greatest combined value of motor power cost, motor reliability, pump reliability and control valve reliability. The specific optimization calculation is not described here, but it should be understood that there are many numerical methods known in the art that can be used to weight each factor and calculate machine set value factor (1114). In this embodiment, the evaluated state therefore comprises motor state variables, pump state variables, control valve state variables and machine set value factor (1114). It will be appreciated that the sequence of calculations in subroutine (1100) can vary. For instance, the input data set (502) may include data closely relating to the motor (120) and modulating control valve (140). In such instance, state variables relating to the motor (120) and the modulating control valve (140) may be calculated first, then state variables relating to the pump (110) may be calculated from aforementioned calculated state variables that would produce the least probability of error according to such data which may be included in the characteristic data set (532).

Referring now back to FIG. 10, since the control loop system (100) is at steady state, and the current state of machine set (101) is known, method (1000) then makes an assumption (1012) that the current value of flowrate (151), which in this embodiment is the process variable, matches the current set point that controller (164) is controlling.

Next, method (1000) uses characteristic data set (532) to perform calculations (1016) to create a correlation function (1018) that calculates the predicted primary input variable of input data set (502), output power (550) in this embodiment, as a function of motor speed. It is to be understood that correlation function (1018) is valid only for the current state of the process variable, flowrate (151) in this embodiment.

Next, method (1000) uses characteristic data set (532) to perform calculations (1014) to determine a set of multiple possible speeds, for example 10 in this embodiment, which can achieve the assumed current set point. The 10 possible speeds range between calculated minimum and maximum values and may be equally spaced.

Next, method (1000) uses correlation function (1018) and characteristic data set (532) to perform calculations (1020) to calculate a set of possible values of the primary input variable of input data set (502), output power (550) in this example embodiment, and one possible value for each corresponding possible motor speed.

Next, for each possible motor speed, method (1000) uses state evaluation subroutine (1100) to evaluate a corresponding possible state of machine set (101). The state with the greatest machine set value factor (1114) is deemed to be the most optimized state, because it has the greatest combined value of motor power cost, motor reliability, pump reliability and control valve reliability. Method (1000) then sets an optimal target speed (1022) equal to the speed corresponding to the state that has the greatest machine set value factor (1114).

If target speed (1022) does not equal current speed, then method (1000) initiates a speed change by setting speed change flag (1008)=TRUE and adjusting the current speed by one predefined speed increment (1024) toward the target speed (1022). It will be understood that after the current speed is adjusted, controller (164) will react by adjusting the position of modulating control valve (140) to maintain the process variable as measured by flowrate sensor (130) at the set point.

Finally, method (1000) pauses for wait time (1007), and then returns back to steady state check (1002) and repeats the primary loop.

As previously explained, method (1000) moves to alternate branch (1050) after speed change check (1006) if speed change flag (1008)=TRUE. Alternate branch (1050) begins with a correlation function validation check (1052), where the primary input variable of input data set (502) is compared to a value predicted by correlation function (1018). In this embodiment, output power (550) is the actual output power and is compared to a predicted output power (1054) calculated using correlation function (1018) at the actual motor speed. If actual output power (550) matches predicted output power (1054) within a predefined tolerance band, then method (1000) proceeds to a target speed check (1056). If the current speed matches target speed (1022), then the speed change is complete, so method (1000) sets speed change flag (1008)=FALSE, pauses for wait time (1007) and then returns back to steady state check (1002) in the primary loop. If the current speed does not match target speed (1022), then the speed change is not yet complete, so method (1000) adjusts the current speed by one increment (1024) toward target speed (1022), pauses for wait time (1007) and then returns back to steady state check (1002) in the primary loop.

If the result of correlation function validation check (1052) is that output power (550) that reflects actual output power does not match the predicted output power (1054) within the predefined tolerance band, then it indicates that method (1000) did not work as expected. There may be several reasons for this, such as controller (164) may have the changed set point while method (1000) is in the middle of a speed change. Another possible reason is that the characteristic data set (532) may contain a significant inaccuracy. Method (1000) then adjusts the current speed by one increment (1024) away from target speed (1022), ends the speed change and sets speed change flag (1008)=FALSE. Optionally, method (1000) may also log this event into an event log, perform an analysis of the event and adjust characteristic data set (532) to improve its accuracy. Then, method (1000) pauses for wait time (1007) and returns back to steady state check (1002) in the primary loop.

In the preferred embodiment of the electronic apparatus and method of the present invention, shown in FIGS. 4-11, the apparatus is configured for use in a control loop system in a throttling control configuration. However, it will be appreciated that this disclosure contemplates that one skilled in the art may configure other embodiments wherein the control loop system is instead in a bypass control configuration, such as control loop system (200).

Likewise, in the preferred embodiment of the electronic apparatus and method of the present invention, shown in FIGS. 4-11, the apparatus is configured for use in a control loop system which contains a working machine that is a rotodynamic pump and a final control element that is a modulating control valve. However, it will be appreciated that this disclosure contemplates that one skilled in the art may configure other embodiments wherein the working machine is instead a fan or blower, and a final control element is instead a damper. Further, additional embodiments could have the damper positioned at the inlet of the working machine, rather than at the outlet.

Similarly, in the preferred embodiment of the electronic apparatus and method of the present invention, shown in FIGS. 4-11, the apparatus is configured for use in a control loop system which contains a working machine that is a rotodynamic pump, but it is contemplated that other embodiments could instead use a positive displacement pump.

Additionally, in the preferred embodiment of the electronic apparatus and method of the present invention, shown in FIGS. 4-11, the apparatus is configured for use in a control loop system which contains an electric motor that runs on AC power, but it is contemplated that additional embodiments could instead use an electric motor that runs instead on DC power.

It will be apparent to those skilled in the art that various modifications can be made in the design and construction of the apparatus and method without departing from the scope or spirit of the claimed subject matter, and that the claims are not limited to the preferred embodiment illustrated herein.

The invention claimed is:

1. An apparatus for optimizing a state of a machine set during normal operation, wherein the machine set includes a working machine, an electric motor driving the working machine, and a final control element, and wherein the machine set is installed in a control loop system having a process variable sensor that measures a process variable for which a process controller utilizes a feedback signal from the process variable sensor to control the process variable at a set point during normal operation by adjusting a position of the final control element, said apparatus comprising:
   at least one apparatus sensor that measures at least one physical property of the machine set including acceleration, velocity, temperature, power, torque, voltage, current, frequency, pressure, flow or speed;
   at least one computer system comprising a processor, memory that stores data and computer-executable instructions, computer hardware by which the processor communicates with the at least one apparatus sensor, and program instructions that store into the memory at least one input data set acquired from the at least one apparatus sensor;
   a characteristic data set stored in the memory of the at least one computer system which describes at least some physical properties, operational behavior and allowable operating ranges that exist during normal operation of the machine set and the control loop system;
   an apparatus controller in communication with the at least one computer system and which controls a speed of the electric motor; and
   wherein the apparatus utilizes the characteristic data set and the at least one input data set to:
      estimate the state of the machine set and estimate the process variable at the set point;
      determine a plurality of possible states of the machine set that would enable the control loop system to continue to maintain the estimated process variable at the set point and that can be reached by adjusting the speed of the electric motor and which are within the allowable operating ranges during normal operation;
      estimate power consumption of the electric motor at the plurality of possible states;
      implement an optimization method which calculates a machine set value factor for each of the plurality of possible states, wherein the machine set value factor is a mathematical combination comprising a power cost factor related to the estimated power consumption of the electric motor and a working machine reliability factor related to reliability of the working machine;
      set a target speed associated with the possible state having the greatest machine set value factor; and
   wherein the apparatus controller controls the speed of the electric motor to reach the target speed, and the process controller of the control loop system subsequently reacts by adjusting the position of the final control element to maintain the process variable at the set point.

2. The apparatus of claim 1 wherein the working machine is a pump and the final control element is a modulating control valve.

3. The apparatus of claim 2 wherein the pump is a rotodynamic pump.

4. The apparatus of claim 1 wherein the working machine is a fan or a blower and the final control element is a damper.

5. The apparatus of claim 1 wherein the mathematical combination further comprises a motor reliability factor related to the reliability of the electric motor.

6. The apparatus of claim 1 wherein the mathematical combination further comprises a final control element reliability factor related to the reliability of the final control element.

7. The apparatus of claim 1 wherein the mathematical combination further comprises a motor reliability factor related to the reliability of the electric motor and a final control element reliability factor related to the reliability of the final control element.

8. The apparatus of claim 1 wherein when the optimization method implemented by the apparatus calculates the mathematical combination of the motor power cost factor and the working machine reliability factor for each of the plurality of possible states, each said motor power cost factor and working machine reliability factor is expressed in a common unit or is unit-less, and the optimization method calculates the greatest relative total machine set value factor.

9. The apparatus of claim 1 wherein the electric motor is driven by AC power.

10. The apparatus of claim 1 wherein the electric motor is driven by DC power.

11. The apparatus of claim 1 wherein the characteristic data set is preprogrammed into the memory, configured during setup, learned during operation, or obtained by a combination thereof.

12. The apparatus of claim 1 wherein the process variable is a flowrate.

13. The apparatus of claim 1 wherein the process variable is a pressure.

14. A method for optimizing a state of a machine set during normal operation, wherein the machine set includes a working machine, an electric motor driving the working machine, and a final control element, and wherein the machine set is installed in a control loop system having a process variable sensor that measures a process variable for which a process controller utilizes a feedback signal from the process variable sensor to control the process variable at a set point during normal operation by adjusting a position of the final control element, said method comprising:
   acquiring an input data set from at least one apparatus sensor measuring at least one physical property of the machine set including acceleration, velocity, temperature, power, torque, voltage, current, frequency, pressure, flow, or speed, wherein the apparatus sensor is associated with at least one apparatus computer system, which communicates with an apparatus controller that controls a speed of the electric motor;
   utilizing the input data set and a characteristic data set, which describes at least some physical properties, operational behavior and allowable operating ranges that exist during normal operation of the machine set and the control loop system, to estimate the state of the machine set;

estimating the set point of the control loop system from the estimated state of the machine set;

utilizing the characteristic data set and the estimated set point to generate at least one correlation function which defines an expected range of the at least one input data set throughout the allowable operating ranges of the machine set;

determining a plurality of possible states of the machine set that would enable the control loop system to continue to maintain the estimated process variable at the set point and is contained within the allowable operating ranges of the machine set, as defined within the characteristic data set;

estimating power consumption of the electric motor at the plurality of possible states;

performing an optimization process which calculates a machine set value factor for each of the plurality of possible states, wherein the machine set value factor is a mathematical combination comprising a motor power cost factor related to the estimated power consumption of the electric motor and a working machine reliability factor related to reliability of the working machine;

setting a target speed associated with the possible state having the greatest machine set value factor;

changing the electric motor speed toward the target speed via the apparatus controller in at least one speed change increment, wherein the process controller subsequently reacts by adjusting the position of the final control element to maintain the estimated set point until the target speed is achieved; and acquiring at least one input data set after changing the electric motor speed by each speed change increment and validating that said at least one input data set is contained within the expected range of the at least one input data set as defined by the at least one correlation function.

15. The method of claim 14 wherein if the at least one input data set acquired after changing the electric motor speed by each speed change increment is not validated by the at least one correlation function, then the apparatus controller reverses the at least one speed change increment by adjusting the electric motor speed away from the target speed by one speed increment, and the method is repeated.

16. The method of claim 14 wherein the working machine is a pump and the final control element is a modulating control valve.

17. The method of claim 16 wherein the pump is a rotodynamic pump.

18. The method of claim 14 wherein the working machine is a fan or a blower and the final control element is a damper or variable inlet vane system.

19. The method of claim 14 wherein the mathematical combination further comprises a motor reliability factor related to the reliability of the electric motor.

20. The method of claim 14 wherein the mathematical combination further comprises a final control element reliability factor related to the reliability of the final control element.

21. The method of claim 14 wherein the mathematical combination further comprises a motor reliability factor related to the reliability of the electric motor and a final control element reliability factor related to the reliability of the final control element.

22. The method of claim 14 wherein the method includes calculating the mathematical combination of the motor power cost factor and the working machine reliability factor for each of the plurality of possible states, each said motor power cost factor and working machine reliability factor is expressed in a common unit or is unit-less, and the method calculates the greatest relative total machine set value factor.

23. The method of claim 14 wherein the electric motor is driven by AC power.

24. The method of claim 14 wherein the electric motor is driven by DC power.

25. The method of claim 14 wherein the characteristic data set is preprogrammed into the memory, configured during setup, learned during operation, or obtained by a combination thereof.

26. The method of claim 14 wherein the process variable is a flowrate.

27. The method of claim 14 wherein the process variable is a pressure.

* * * * *